US005532598A

United States Patent [19]
Clark, Jr. et al.

[11] Patent Number: 5,532,598
[45] Date of Patent: Jul. 2, 1996

[54] AMORPHOUS METAL TAGGING SYSTEM FOR UNDERGROUND STRUCTURES INCLUDING ELONGATED PARTICLES OF AMORPHOUS METAL EMBEDDED IN NONMAGNETIC AND NONCONDUCTIVE MATERIAL

[75] Inventors: William G. Clark, Jr., Murrysville Boro; Warren R. Junker, Monroeville; William A. Byers, Penn Hills Township; John J. Herald, Monroeville; Rajender K. Sadhir, Murrysville, all of Pa.

[73] Assignee: Westinghouse Electric Corporation, Pittsburgh, Pa.

[21] Appl. No.: 248,905

[22] Filed: May 25, 1994

[51] Int. Cl.$^6$ .............................. G01R 19/00; G01V 3/08
[52] U.S. Cl. ................................ 324/326; 324/67
[58] Field of Search .......................... 324/207.11, 207.13, 324/207.15, 207.16, 207.17, 207.22, 209, 326, 66, 67, 329; 340/551, 572, 573, 571

[56] References Cited

U.S. PATENT DOCUMENTS

| | | |
|---|---|---|
| 3,633,533 | 1/1972 | Allen et al. |
| 4,197,104 | 4/1980 | Krystyniak et al. |
| 4,298,862 | 11/1981 | Gregor et al. ......................... 340/572 |
| 4,573,829 | 3/1986 | Keene et al. |
| 4,660,025 | 4/1987 | Humphrey . |
| 4,686,516 | 8/1987 | Humphrey ............................ 340/572 |
| 4,797,658 | 1/1989 | Humphrey ............................ 340/551 |
| 4,859,991 | 8/1989 | Watkins et al. |
| 4,940,966 | 7/1990 | Pettigrew et al. ..................... 340/551 |
| 4,944,185 | 7/1990 | Clark, Jr. et al. |
| 4,980,670 | 12/1990 | Humphrey et al. ..................... 340/551 |
| 5,003,291 | 3/1991 | Strom-Olsen et al. .................. 340/551 |
| 5,017,873 | 5/1991 | Rippingale et al. |
| 5,029,291 | 7/1991 | Zhou et al. ............................. 340/551 |
| 5,036,210 | 7/1991 | Goodman . |
| 5,037,494 | 8/1991 | Hilzinger et al. |

(List continued on next page.)

FOREIGN PATENT DOCUMENTS

| | | |
|---|---|---|
| 0408320 | 1/1991 | European Pat. Off. |
| 0448114 | 9/1991 | European Pat. Off. |
| 8804436 | 6/1988 | WIPO . |
| 8906810 | 7/1989 | WIPO . |
| 9207286 | 4/1992 | WIPO . |

OTHER PUBLICATIONS

"Amorphous Metal Fiber Labels Foil Shoplifters" by Tsukasa Furukawa; 1987.
Brochure from Sensormatic "New Hi–Tech Antitheft System Puts The Collar On Workplace Crooks"; 1983.
Brochure from Sensormatic "Sensormatic's MicroLabel"; 1985.
Brochure from Metglas "Amorphous Magnetic Alloys", Technical Bulletin; 2705M; 1985.
Brochure from Sensormatic "An End To Profit Sharing" The Ultra Max System; 1987.

*Primary Examiner*—Sandra L. O'Shea
*Assistant Examiner*—Roger Phillips

[57] ABSTRACT

An electromagnetic tagging system is provided for remotely detecting and locating polymeric and other non-conductive structures situated behind barriers, such as underground plastic pipes or containers. The system comprises a fluctuating magnetic field source, a pattern of tags embedded in discrete regions of the wall of the polymeric structure, each tag including an amorphous magnetic metal target for generating a Barkhausen response when exposed to the fluctuating magnetic field source, and a portable detection circuit movable along the ground or other control surface for remotely detecting the Barkhausen response. The amorphous magnetic material in each tag is preferably in the form of a plurality of elongated particles having aspect ratios of at least 3 to 1 and arranged end-to-end. The pattern that the tags are arranged in provide information concerning the identity, orientation, or extent of the structure, and the portable detection circuit is capable of detecting at least two of the tags simultaneously as it is moved over the surface of the ground so that the patterns of the tags may be easily determined.

17 Claims, 5 Drawing Sheets

U.S. PATENT DOCUMENTS

| | | |
|---|---|---|
| 5,043,666 | 7/1991 | Tavernetti et al. . |
| 5,045,368 | 9/1991 | Cosman et al. .......................... 324/326 |
| 5,051,034 | 9/1991 | Goodman . |
| 5,122,750 | 6/1992 | Rippingale et al. . |
| 5,175,419 | 12/1992 | Yamashita ............................... 340/551 |
| 5,200,704 | 4/1993 | Clark, Jr. et al. . |
| 5,204,526 | 4/1993 | Yamashita et al. ..................... 340/551 |
| 5,268,043 | 12/1993 | McCowan ............................... 340/551 |
| 5,313,192 | 5/1994 | Ho et al. ................................. 340/551 |

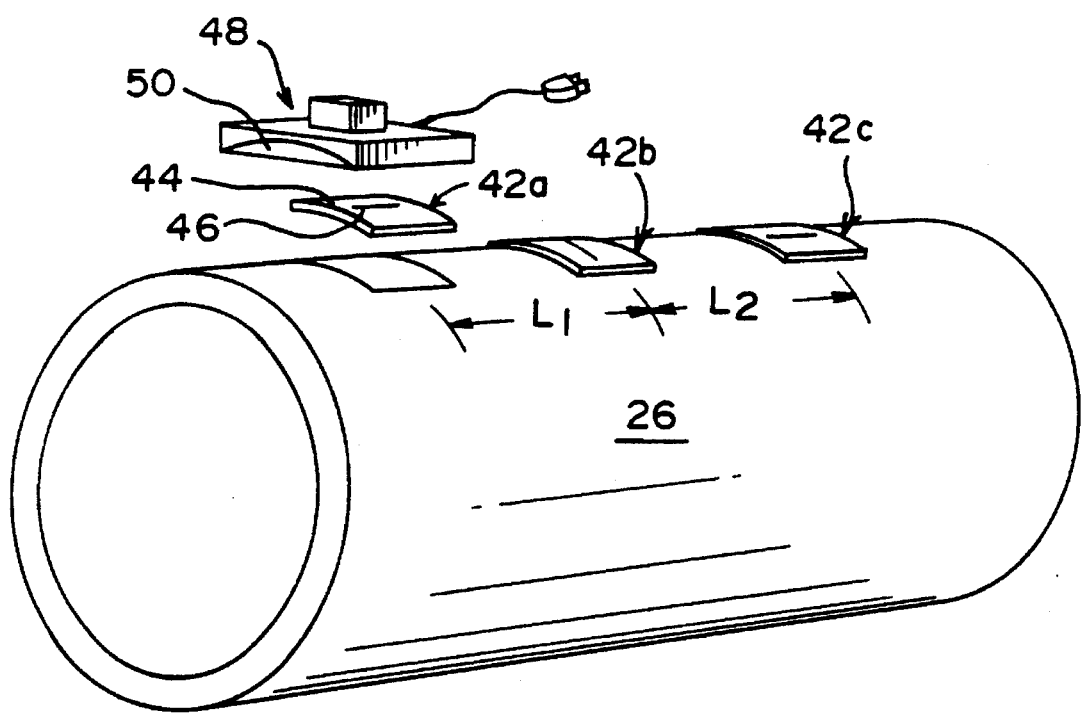
FIG. 5
FIG. 6
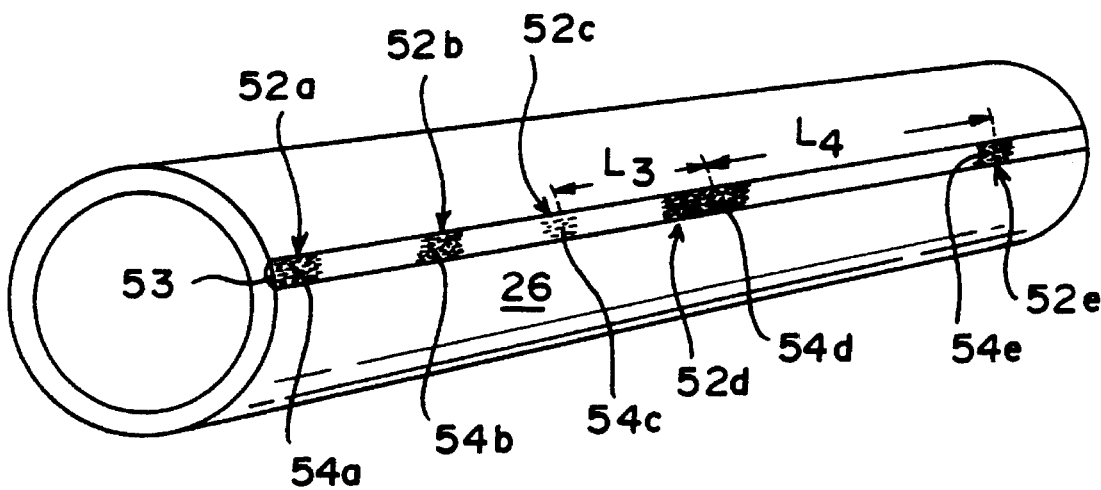

AMORPHOUS METAL TAGGING SYSTEM FOR UNDERGROUND STRUCTURES INCLUDING ELONGATED PARTICLES OF AMORPHOUS METAL EMBEDDED IN NONMAGNETIC AND NONCONDUCTIVE MATERIAL

BACKGROUND OF THE INVENTION

This invention generally relates to electromagnetic tagging systems, and is specifically concerned with a system for remotely detecting and locating polymeric structures of difficult accessibility, such as buried plastic pipes or containers.

Thermoplastic polymers such as polyethylene, polyvinylfluoride, and polypropylene are particularly attractive materials for making buried piping, underground storage containers, and structural geotextiles. These materials are easy to handle, lightweight, relatively inexpensive, easy to join and repair, and (unlike metal pipes and containers) highly resistant to corrosion damage. However, despite these advantages, repair and maintenance of such polymeric structures does become necessary from time to time. And, once buried in the ground or covered with another material, the structures formed from these polymers are virtually impossible to remotely locate by known electronic sensors. Hence, extensive excavation is often necessary to find such structures. The inability to accurately detect the location of such polymer structures can result in accidental damage during the locating excavation. This is a particularly acute problem in the case of polymeric high integrity containers (HIC's) that hold toxic wastes, since accidental damage to these containers resulting from excavation could release radioactive or chemically hazardous materials into the environment.

In the past, a number of techniques have been developed to expedite the location of buried plastic components with particular emphasis on piping. Brightly colored marker ribbons buried above the polymer offer some detection enhancement. However, excavation is required to locate the marker itself and it is possible for the marker and buried component to "drift" over time, resulting in less accurate positioning. Metallic foils and magnetic particle tagged ribbons have also been developed to permit remote electronic location of the markers with metal detectors or eddy current probes. While this approach can minimize exploratory excavation to locate the polymer, the problem of marker drift remains.

Attempts to "mark" the buried component itself so that it becomes visible to electronic detection have included tagging the polymer with embedded magnetic particles, as disclosed in Goodman U.S. Pat. No. 5,051,034, or installing a target wire on the inside of the pipe as disclosed in the Keene U.S. Pat. No. 4,573,829. Unfortunately, the relatively weak detection signal produced by both of these techniques limits the use of these systems to pipes that are buried only at shallow depths. A simple wire conductor provides a relatively small target that does not produce a strong signal unless it is energized with an electric current. However, such energization of course requires access to the wire which complicates the detection operation. When magnetic particles are used, a substantial amount of magnetic material must be added to the polymer in order to produce a strong magnetic signal at typical buried pipe distances of one to two meters. As the target distances and sizes become smaller, concentrations exceeding 50 percent may be required. Such high levels of hard particle additions to thermoplastic alloys can destroy the unique and advantageous mechanical properties that make these materials so attractive for buried component applications. Moreover, when either conductive wires or magnetic particles are used as markers, the signals they generate can be so similar to those generated by adjacent ferromagnetic components (such as iron pipes or steel reinforcing bars) such that a high degree of ambiguity and inaccuracy begins to taint the detection signal.

Clearly, what is needed is a system for tagging underground polymeric structures that provides a strong and unambiguous detection signal, but which does not compromise the advantageous mechanical characteristics of the polymeric material forming the structure. Ideally, the system would be capable of not only accurately detecting the presence of a tagged underground structure at greater distances than the prior art, but of also providing information concerning the orientation, identity, and precise location of the structure despite the close presence of other structures made from ferromagnetic materials. Finally, the system should be inexpensive and simple to implement and convenient to use.

SUMMARY OF THE INVENTION

Generally speaking, the invention is an electromagnetic tagging system for remotely detecting and locating a non-electrically conductive, non-magnetic structure situated behind a barrier or located underground that comprises a fluctuating magnetic field source, at least one tag imbedded in a discrete region of a wall of the structure that includes an amorphous magnetic metal target for generating a Barkhausen response when exposed to a fluctuating magnetic field, and a portable detection circuit movable along the ground or control surface for remotely detecting the Barkhausen response. This system preferably includes a plurality of tags pre-arranged in a pattern in the walls of the structure that expresses such information as identity, orientation, or extent of the structure. The range of the portable detection circuit and the distances between adjacent tags are selected such that the portable detection circuit can simultaneously detect at least two of the tags as it is moved along the ground or other control surface so that the orientation of the pattern of tags may be easily determined. The system is particularly well adapted for detecting the presence, orientation, extent, and identity of polymeric structures such as plastic pipes or disposable containers that are located underground or in a wall or beneath a floor or pavement.

In the preferred embodiment of the invention, the targets of the tag may be formed from a plurality of elongated particles of amorphous magnetic metal having aspect ratios of at least 3 to 1. The longitudinal axes of the elongated particles are preferably aligned parallel to one another and are sufficiently close end-to-end to be magnetically linked to one another. The inventors have surprisingly discovered that such an arrangement of aligned, elongated particles behave much like a single, larger wire would in producing a desired strong and easily detectable Barkhausen response. Alternately, the targets of each of the tags may be formed from a single wire having an aspect ratio of over 5000 to 1 between its length and its maximum diameter. In either embodiment, the applicants have observed that the strength and detectability of the resulting Barkhausen response is maximized with respect to the amount of magnetic amorphous metal used to form the targets and the tags. However, when elongated particles are used to form the targets, additional information may be encoded into the pattern of tags by varying the alignment, density, and specific composition of the amorphous metal forming the particles. Additionally, elongated particles are relatively easy to embed into the wall of the pipe or container or other polymeric structure than a long, thin wire of amorphous metal.

While the magnetic amorphous metal forming the targets of the tags may be taped or glued to the walls of the structure, it is preferably discretely embedded directly into the polymeric material forming the structure. The amorphous metal may alternatively be pre-embedded in another polymeric material which is either co-extruded or independently fused onto the wall or walls of the structure to be detected. Preferably, the polymeric material that the amorphous metal is initially embedded into is color coded so that its location on the structure may be easily visually determined. Such color coding advantageously allows the persons installing the structure to orient the structure so that the tags are closest to the surface of the ground or other control surface.

In addition to containing amorphous magnetic metal, each of the tags of this system may additionally include ferrite particles surrounding the amorphous metal. The resulting combination of magnetizable ferrite particles and amorphous metal advantageously provides a number of alternative encoding options.

BRIEF DESCRIPTION OF THE SEVERAL FIGURES

FIG. 5 illustrates how discrete, heat-fusible tags may be affixed onto the outer walls of a plastic pipe;

FIG. 6 illustrates how the tags may be co-extruded along with a plastic pipe in order to produce multiple tags that are interconnected by a single, continuous matrix;

Figure 9:
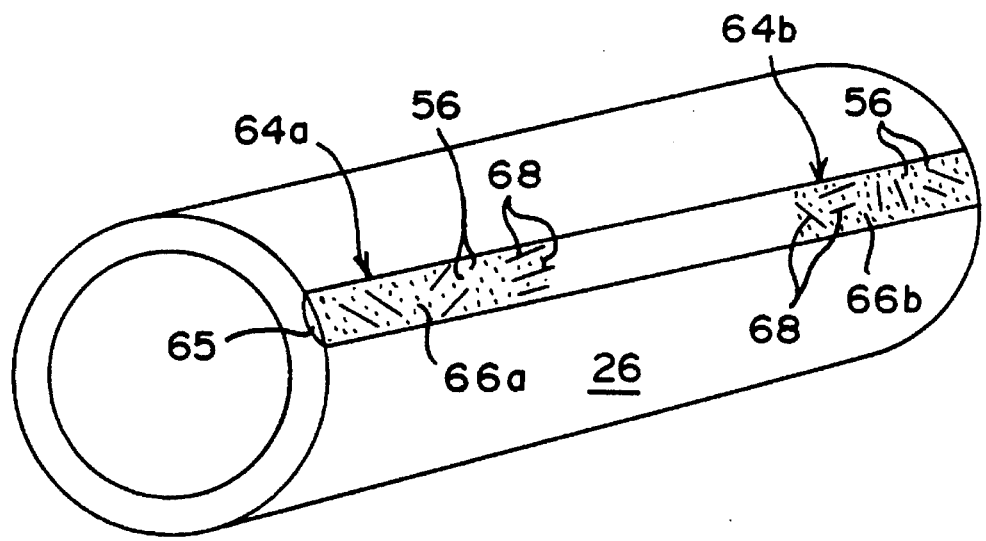
Figure 10:
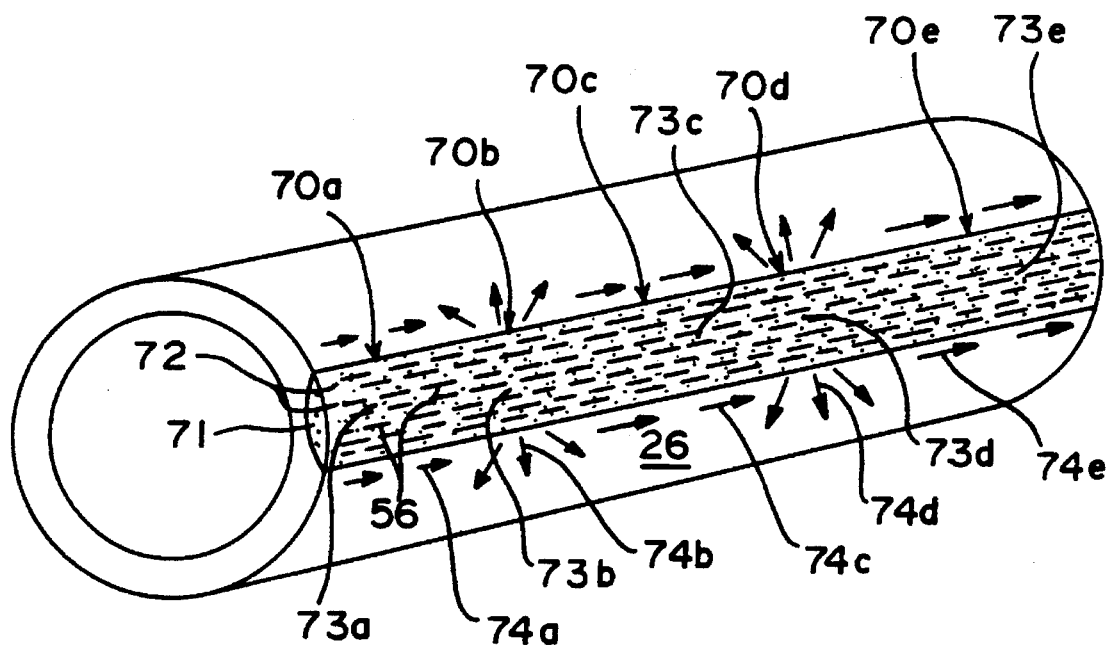

FIG. 9 illustrates still another embodiment of the system wherein the tags are formed in a continuous matrix, each tag including a plurality of amorphous magnetic metal fibers intermixed with a cluster of elongated particles of amorphous magnetic metal, and FIG. 10 illustrates still another embodiment of the system wherein multiple tags are formed in a continuous matrix by superimposing patches of ferrite having different magnetic orientations over a distribution of aligned, elongated particles of amorphous magnetic metal.

DETAILED DESCRIPTION OF THE PREFERRED EMBODIMENTS

Figure 1:
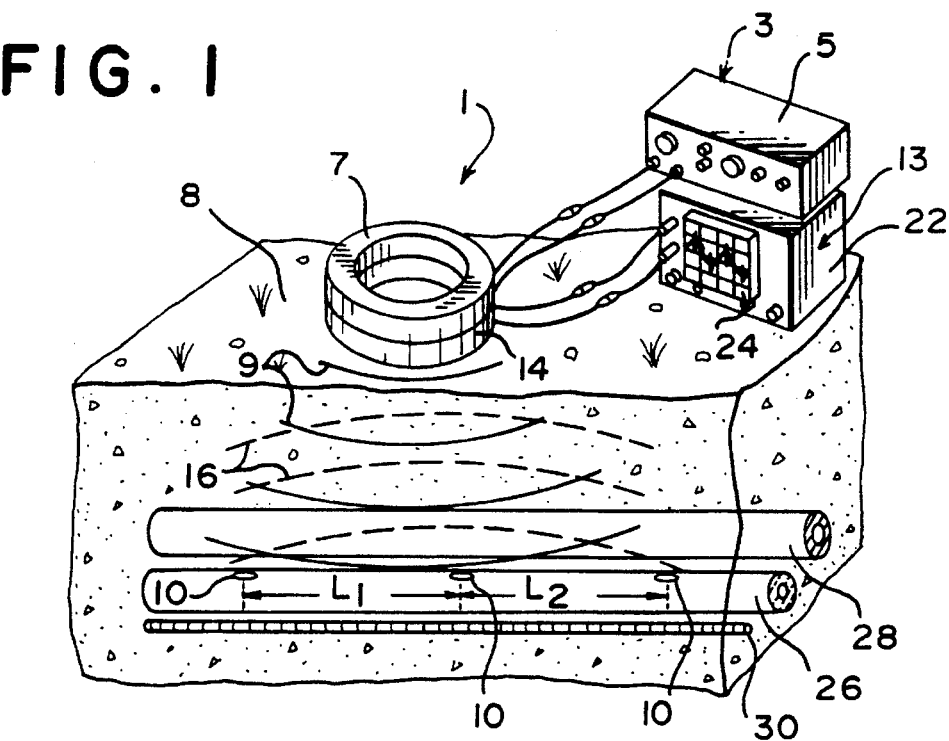
FIG. 1 is a schematic diagram of the system of the invention in operation, illustrating how an underground plastic pipe that has been tagged in accordance with the invention may be electronically detected.

With reference to FIG. 1, the inventive system 1 of the invention generally comprises three components, including a transmitter circuit 3 for generating a fluctuating electromagnetic field, at least one tag 10 that generates a Barkhausen response when exposed to the field, and a receiver circuit 13 for receiving and filtering out the Barkhausen response generated by tag 10.

The transmitter circuit 3 includes an AC driver 5 for generating a fluctuating current having a frequency of preferably about 50 hertz. The output of the AC driver 5 is in turn connected to a loop-type transmitting antennae 7 that in turn emanates a fluctuating electromagnetic field 9. Both the transmitter circuit 3 and receiver circuit 13 (along with their respective antennas) are movable along the ground 8 (or other control surface) for the purpose of locating the presence of one or more tags 10 which are present in an underground structure, such as the plastic pipe 26. The circuits 3 and 13 may be moved along the ground via a handcart, motor vehicle, or even a low flying helicopter of airplane.

Figure 2:
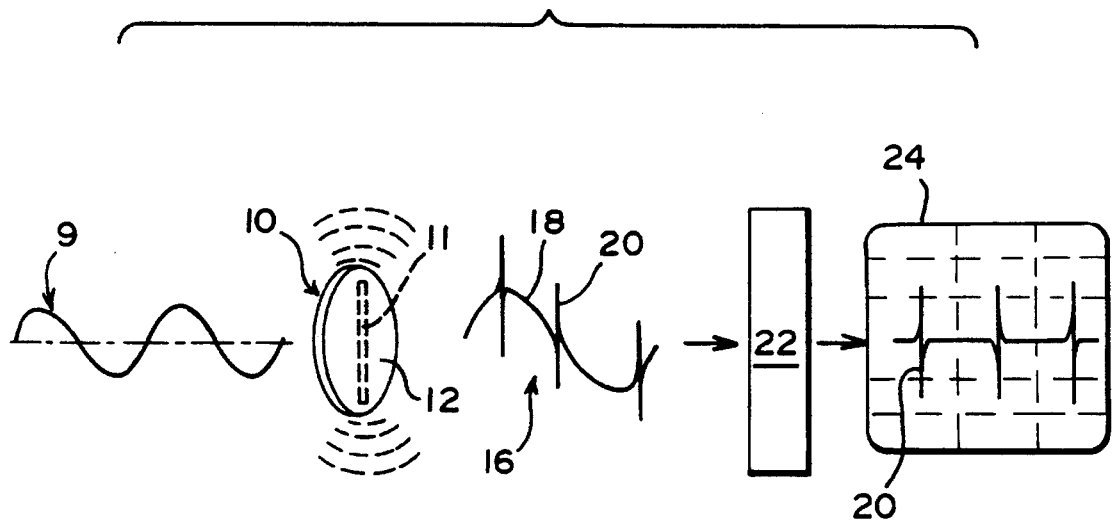
FIG. 2 is a schematic diagram illustrating how the amorphous magnetic target in each of the tags of the system generates a Barkhausen response when exposed to a fluctuating magnetic field, and how this response may be filtered out and displayed on an oscilloscope.

With reference now to FIGS. 1 and 2, each tag 10 used in the system 1 of the invention includes a amorphous magnetic metal target 11 surrounded by a matrix 12 of polymeric material. The amorphous magnetic metal used in the target may be, for example, an alloy of iron, nickel and cobalt known as Metglas alloy 2714A sold by Metglas Products located in Parsippany, N.J. As will be seen in more detail hereinafter, the metallurgical structure of such amorphous alloys is dominated by large magnetic domains that can be aligned through processing such that an external alternating electromagnetic field can initiate simultaneous and instantaneous realignment of the domains, thus producing unique electromagnetic signals known as the Barkhausen response. The metal forming the target 11 of the tag may be a single piece of amorphous magnetic metal, or a group of elongated particles of such metal. The polymeric matrix 12 surrounding the target 11 may be formed from the same polymeric material that forms the structure to which the tag 10 is adhered.

The receiver circuit 13 includes a receiving antennae 14 for receiving the signal 16 emanated by the metal target 11 of the tag 10 in response to the fluctuating magnetic field 9 generated by the transmitting antennae 7. As is best seen in FIG. 2, the signal 16 generated by the target 11 includes a sinusoidal carrier wave 18 onto which a Barkhausen response 20 is superimposed. An electronic filter circuit 22 that forms part of the receiver circuit 13 filters out the carrier wave 18, leaving only the Barkhausen response 20 to be displayed on the screen of an oscilloscope 24. A specific example of a transmitter and receiver circuit of the type which may be employed in the system 1 of the invention is disclosed in U.S. Pat. No. 4,859,991, the entire specification of which is incorporated herein by reference.

The specific Barkhausen response of a particular tag 10 is highly dependent upon such factors as the specific composition of the amorphous magnetic metal forming the target, the orientation of the target, and the amount and aspect ratio of the metal in the target 11. Because of the highly distinctive and individual characteristics of the particular Barkhausen response elicited from a particular target 11, the system 1 is capable of readily detecting the tags 10 embedded in small discrete portions of a plastic pipe 26, even though the plastic pipe 26 may be flanked by a steel pipe 28, and an iron reinforcing bar 30.

In the preferred embodiment of the system 1, a plurality of tags 10 are embedded in discrete portions of the walls of the pipe 26 along its longitudinal axis as shown. The spacing of the tags 10 along the longitudinal axis of the pipe 26 indicates to the operator of the system 1 the orientation of the pipe 26. Additionally, the tags 10 may be spaced apart selected distances L1, L2 corresponding to a code which can inform the system operator as to the function of the pipe (i.e., whether to conduct gas or water), the manufacturer of the pipe, the date of installation, etc., much like the bar codes used by retailers. If multiple tags 10 are to be used in the structure to be detected, the range of detection of the receiver circuit 13 and the spacing of the tags 10 on the pipe 26 or other structure should be arranged such that the receiver circuit 13 can simultaneously detect at least two tags 10 in the pipe 26 at once. That way, the system operator can quickly determine the orientation of the pipe 26 or other structure, and further begin quickly decode the information contained in the specific longitudinal spacing of the tags 10 in the pipe 26.

Figure 3:
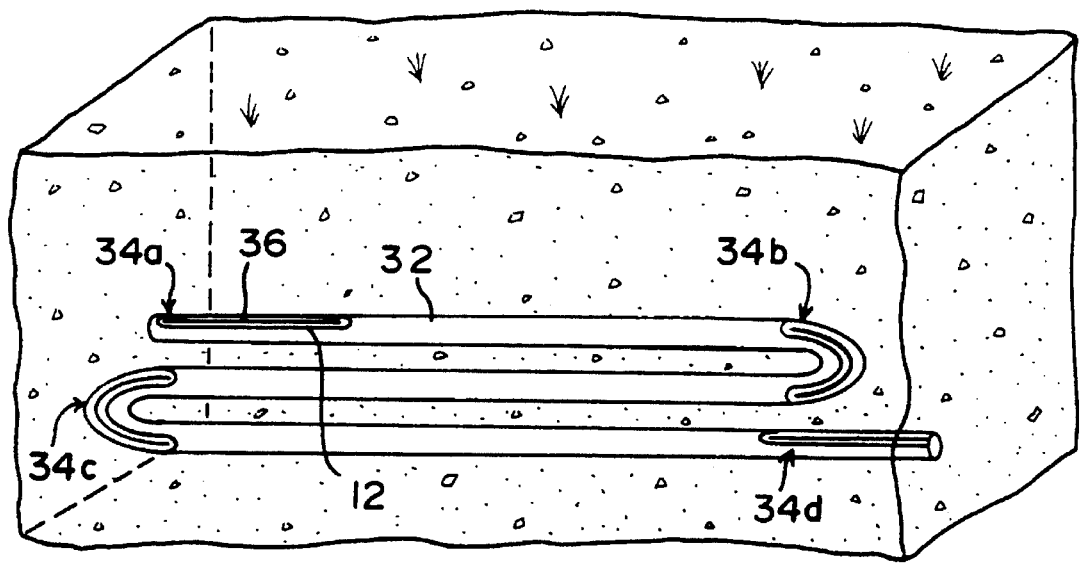
FIG. 3 illustrates a second embodiment of the system, wherein elongated tags having wire-like amorphous magnetic targets having a high aspect ratio are used.

FIG. 3 illustrates how the system 1 may utilize elongated tags 34 in structures such as underground plastic convoluted pipes 32. Each of the elongated tags 34a–d includes an amorphous magnetic metal wire target 36 which preferably has an aspect ratio of at least 1 to 5000 between its diameter and its length. The wire target 36 is embedded in a polymeric matrix 12 as previously discussed. The use of such a wire target 36 has at least two advantages when applied to structures such as the convoluted pipe 32. First, the fact that the wire targets 36 in the tags 34b and 34c can follow the contours of elbows or joints, in the pipe 32 allows the system operator to obtain an accurate picture of the position, orientation, and precise extent of the pipe 32. Secondly, the applicants have observed that when the metal comprising the target is formed into a shape having a high aspect ratio, the strength of the signal carrying the Barkhausen response is considerably strengthened. Thus, the use of a long thin wire target 36 in the elongated tags 34a–d maximizes the strength of the detection signal while minimizing the amount of amorphous magnetic metal needed in the targets. While the use of a plurality of long thin wire targets 36 is specifically shown in FIG. 3, a single long, thin wire that continuously follows the length of the structure may alternatively be used.

Figure 4:
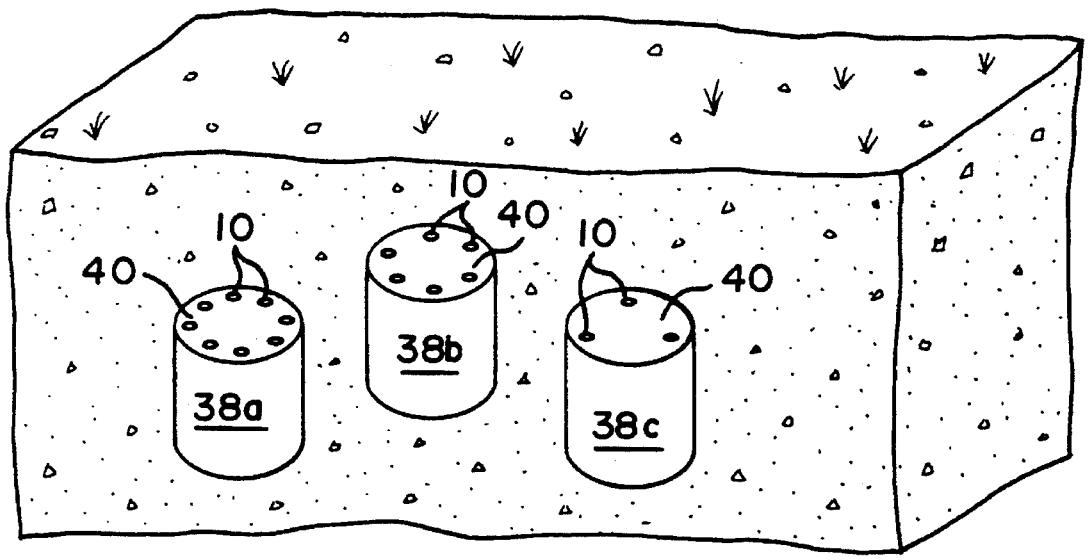
FIG. 4 illustrates how the system may be incorporated into the molded plastic lids of underground toxic waste canisters in order to facilitate the accurate location of such canisters, as well as their contents.

FIG. 4 illustrates how the system 1 may be used to accurately locate toxic waste containers, and even identify their contents. In this particular embodiment of the invention, a pattern of tags 10 are embedded around the circumference of the plastic lids 40 covering the tops of toxic waste canisters 38a–c. The number and arrangement of the tags 10 in each of the canister lids 40 is different in order to indicate different information concerning the canisters (i.e., the type of toxic waste contained, date of burial, manufacturer of the canister, etc.). While not shown in the drawing, additional tags 10 could be placed along the walls or the bottoms of the canisters 38a–c in order to provide more information about the orientation and extent of the canisters.

FIG. 5 illustrates how a plurality of discrete, heat-fusible tags 42a–c may conveniently be applied to the walls of a polymeric pipe 26. The polymeric matrix 44 of each of the tags 42a–c is formed from a thermoplastic material which will soften when heated. While each of the tags 42a–c is shown with a single amorphous magnetic element 46, multiple elements may be used as well. An iron 48 having an electrical resistance element (not shown) and a heating surface 50 is used to fuse the tags 42a–c onto the outer wall of a polymeric pipe 26. Preferably the heating surface 50 of the iron 48 has a curved profile that is complementary to the outer diameter of the pipe 26 so that the heat may be uniformly applied over the upper surface of the tags 42a–c. In the embodiment of the system illustrated in FIG. 5, the tags 42a–c are linearly spaced along the longitudinal axis of the pipe 26 distances L1,L2 in accordance with a distance code capable of indicating such information as the type of material carried through the pipe 26, the date the pipe was installed in the ground, the manufacturer of the pipe, etc. Additionally, the manner in which the target elements 46 of the tags 42a–c are oriented can further provide a basis for a code useful in providing information about the pipe 26. Note, for example, how the single amorphous magnetic target element 46 in the heat-fusible tag 42b is oriented orthogonally with respect to the target elements in the adjacent tags 42a and 42c. As the specific characteristics of the Barkhausen response from the target elements 46 is dependent in part upon the orientation of these elements with respect to the transmitting and receiving antennas of the transmitter and receiver circuits 3 and 14, it follows that target element orientation can add a valuable additional variable to any coding scheme that the manufacturer or installer of the pipe 26 wishes to impose on the tags 42a–c. Additionally, the polymeric matrix 44 may be distinctively colored in order to assist the persons fusibly affixing the tags 42a–c on the pipe 26 and arranging them into a desired order. Such coloration would also assist the installer of the pipe 26 in turning the pipe so that the tags 42a–c are upwardly oriented in order to minimize the distance between the antennas of the transmitter and receiver circuit 3 and 14 when they are scanned across the ground 8 to locate the pipe 26, and to decode the information associated with the pattern and orientation of the tags 42a–c.

In the various embodiments of the system 1 described thus far, the tags have taken the form of tags 10, 34, and 42 having discrete polymeric matrices which encase a single target element. In other embodiments of the system 1, the tags may all share the same, continuous matrix, and have targets which are formed from multiple elements of amorphous metal material, such as elongated particles or fibers, in lieu of a single element. Such continuous matrix tags all offer the advantage of being readily incorporated into the sidewalls of a polymeric structure, such as a pipe, by a relatively simple process of co-extrusion. Additionally, the continuous matrix used for all of the tags may be formed from a distinct color like the previously-described matrices of the tags 42a–c in order to assist the persons who install the pipe in orienting the tag side upwardly. Finally, the use of multiple target elements in lieu of a single target element not only provides still more encodable variables for the storage of information about the pipe or other structure (such as dimensions, diameter, manufacturer, material used, batch number, etc.), but further maximizes the strength of the Barkhausen response signal for a given quantity of amorphous magnetic metal.

Figure 7:
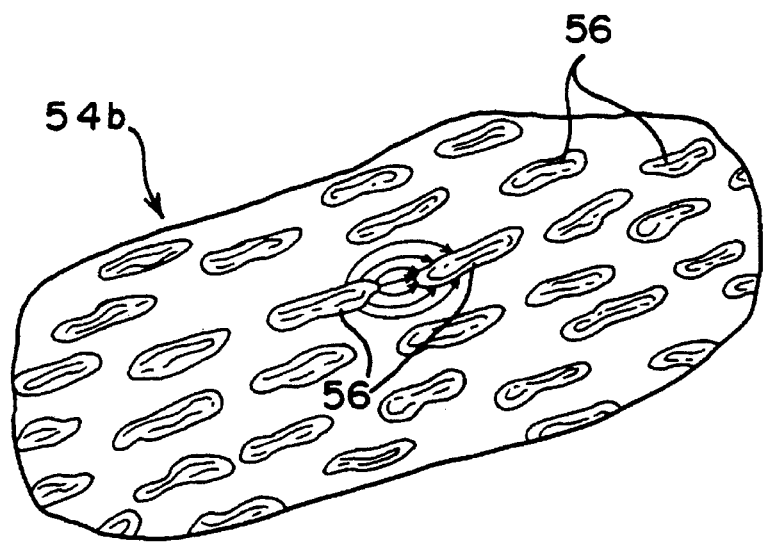
FIG. 7 is an enlargement of a multiple-element target which may be used in the tags of the system, wherein the elements comprise elongated particles of amorphous magnetic metal having an aspect ratio of at least 3 to 1 between their lengths and their diameters.

FIG. 6 is an embodiment of the system 1 utilizing continuous matrix tags 52a–e having all the aforementioned advantages. These tags 52a–e are formed from a continuous polymeric matrix 53 which is preferably co-extruded along with the walls of the pipe 26 or other structure. Each of the tags 52a–e includes a target 54a–e formed from multiple target elements, which in this case is elongated particles 56 of amorphous magnetic metal. With references now to both FIGS. 6 and 7, the elongated particles 56 each have an aspect ratio of at least 1 to 3 with respect to their diameters versus their lengths. Moreover, the particles 56 are preferably aligned parallel to one another with respect to their longitudinal axis as illustrated, and are further assembled at a density sufficient to allow the individual particles 56 to magnetically interact end-to-end with respect to one another when exposed to the fluctuating magnetic field generated by the transmitter circuit 3. The end-to-end spacing which results from such a minimum density allow each irregular row of elongated particles 56 to behave in much the same way as though it were a single, continuous wire of such amorphous magnetic material. Thus a maximum Barkhausen response is generated with a minimum amount of the amorphous magnetic material forming the elongated particles 56.

The use of multiple elongated particles 56 within the individual targets 54a–e of each of the continuous matrix tags 52a–e provides more variables that can be advantageously encoded to provide information about the pipe 26 than targets formed from a single magnetic element. Specifically, the individual targets 54a–e may be made larger or smaller, and of different densities. The composition of the elongated particles forming each of the discrete targets 54a–e may further be made different to provide different Barkhausen responses. Of course, different linear spacing L3, L4 between adjacent tags 52c–52e may be used in addition to all of the size, density, and compositional variables to encode useful information about the pipe 26.

Figure 8:
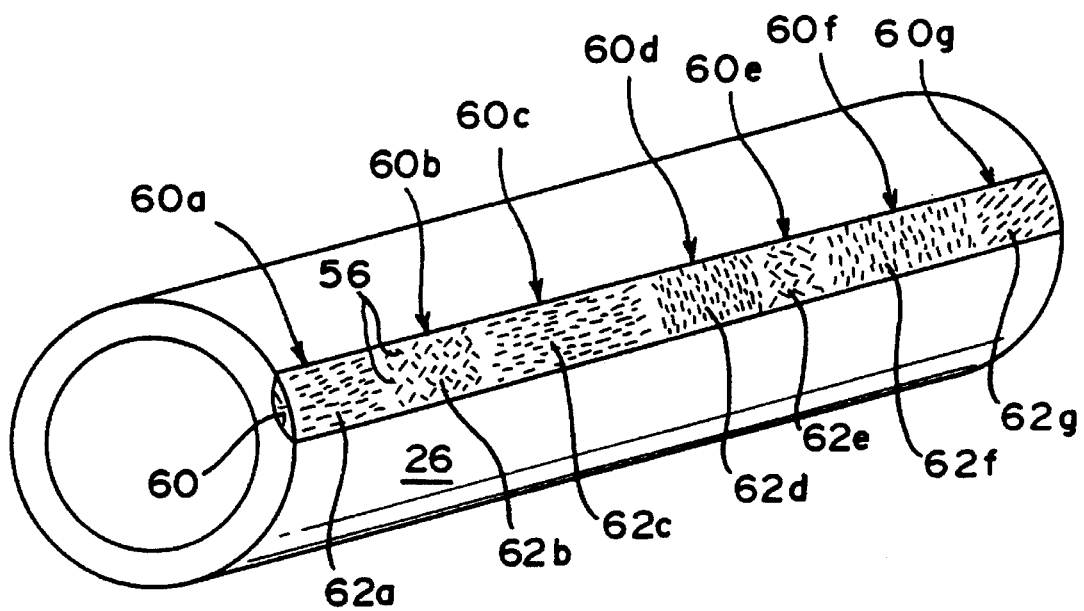
FIG. 8 illustrates how multiple tags may be formed by co-extruding clusters of elongated particles of amorphous metal at different orientations in the same continuous matrix.

FIG. 8 illustrates another embodiment of the system 1 that uses continuous matrix tags 60a–g capable of encoding information in a different manner than the previously-discussed continuous matrix tags 52a–e. Like the previously-discussed tags, the tags 60a–g are formed from a continuous matrix 61 in which are embedded multiple element targets 62a–g. However, instead of varying the density of the elongated particles 56, the orientation of these particles 56 is varied with respect to the longitudinal axis of the pipe 26. Note in particular that while the particles forming the targets 62a and 62c are parallel to the longitudinal axis of the pipe 26, the particles forming the targets of 62d and 62f are orthogonal to this axis. Moreover, the particles forming the target 62b are randomly aligned with respect to the longitudinal axis of the pipe 26, while the particles of the target 62g are obliquely aligned with this axis. Of course, there is no reason that the orientation and coding scheme present in the continuous matrix tags 60a–g could not also incorporate the density and size encoding scheme utilized in the continuous matrix tags 52a–e.

FIG. 9 illustrates continuous matrix tags 64a,b which incorporate still another form of encoding. Each of these tags 64a,b shares a continuous matrix 65 which, like the matrix of the tags 52a–e and 60a–g is preferably co-extruded with the pipe 26 or other structure. However, the targets 66a,b of these tags are not exclusively formed from the previously-described elongated particles 56 of amorphous magnetic metal, but further include fibers 68 of the target metal as well. The fibers 68 generally do not follow the orientation of the elongated particles 56 that comprise the balance of the target, and may be ranged at random orientations as shown. The Barkhausen response of the targets 66a,b will vary in accordance with the amount and orientation of the metal fibers 68 intermixed with the parallel elongated particles 56 that form the balance of the target.

FIG. 10 illustrates still another embodiment of the system 1 that utilizes continuous matrix tags 70a–e which are encoded by still another technique. Each of the tags 70a–e again share a common, continuous matrix 71 that is preferably co-extruded into the walls of the pipe 26. However, this continuous matrix 71 includes permanently magnetizable ferrite particles 72 as shown. Elongated particles 56 of amorphous magnetic metal are embedded into the continuous matrix 71 at a uniform density and at an alignment that is parallel to the longitudinal axis of the pipe 26. Unlike any of the previously-discussed tags, the individual targets 73a–e of the tags 70a–e are formed from discretely magnetized regions 74a–e of the ferrite particles 72 in the matrix 71. The field characteristics of each of the discrete regions 74a–e is different from the field characteristics of each of the adjacent fields. Each discrete region 74a–e of magnetic flux interacts with the elongated particles 56 of amorphous magnetic metal contained therein to impress a distinctive electronic signature on the resulting Barkhausen response of the particles 56. While each of the various embodiments of the system 1 have been described with respect to underground structures, it should be noted that the system 1 is applicable to any structure of difficult accessibility (i.e., plumbing pipes in walls, hydraulic fluid lines in airplane wings, etc.). Moreover, each of the various embodiments of the system 1 is applicable not only to structures or components formed from polymeric materials, but from any material which is not readily electronically detectable (i.e., ceramics, glass, wood, etc.). Thus the invention is not to be limited by the examples given in the specification, but only by the claims appended thereto.

What is claimed:

1. An electromagnetic tagging system for remotely detecting and locating a structure formed from a non-electrically conductive, non-magnetic material that is situated behind a barrier having a control surface by a means for generating a fluctuating magnetic field, comprising:

at least one tag means integrated into said structure and including an amorphous metal target for generating a signal containing a response characteristic of amorphous metal when exposed to said fluctuating magnetic field, said target being formed from a plurality of elongated particles of a single alloy of amorphous magnetic metal embedded in the same electrically non-conductive and non-magnetic material forming the structure and having length to diameter aspect ratios of at least three to one, and being aligned substantially parallel and along their longitudinal axes with respect to one another and being sufficiently close end-to-end to be magnetically linked to one another to enhance the strength of said signal, and portable circuit means movable relative to said control surface for remotely detecting said characteristic response in said generated signal.

2. The electromagnetic tagging system of claim 1, wherein said system comprises a plurality of tag means arranged in a pattern in walls of said structure for expressing the identity, orientation, or extent of said structure.

3. The electromagnetic tagging system of claim 2, wherein at least two of the targets of said plurality of tag means are formed from said plurality of elongated particles of amorphous magnetic metal, and wherein the direction of alignment of the particles in said two targets is different for expressing information about said structure.

4. The electromagnetic tagging system of claim 2, wherein at least two of the targets of said plurality of tag means are formed from said plurality of elongated particles of amorphous magnetic metal, and wherein the density of the particles forming said two targets is different for expressing information about said structure.

5. The electromagnetic tagging system of claim 2, wherein at least two of the targets of said plurality of tag means include said plurality of elongated particles of amorphous magnetic metal, and wherein the composition of the particles in said two targets is different for expressing information about said structure.

6. The electromagnetic tagging system of claim 2, wherein said characteristic response is a Barkhausen response, and said circuit means is capable of simultaneously detecting the Barkhausen response of at least two of said tag means when moved along said control surface.

7. The electromagnetic tagging system of claim 2, wherein said characteristic response is a Barkhausen response, and specific electronic characteristics of the Barkhausen response of said plurality of tag means provide a signature code expressing information concerning the structure, and wherein said circuit means includes means for decoding said signature code.

8. The electromagnetic tagging system of claim 2, wherein said tags are substantially colinearly spaced apart along a length of said wall so that the extent and orientation of said wall can be determined by said portable detection means.

9. The electromagnetic tagging system of claim 8, wherein said structure is an elongated polymeric conduit, and said tags are spaced on a wall of said conduit along the longitudinal axis thereof so that the length and orientation of said conduit may be determined.

10. The electromagnetic tagging system of claim 1, wherein said structure is formed from a fusible polymeric material, and the amorphous metal target of said tag is fused into a discrete portion of a wall of said structure.

11. The electromagnetic tagging system of claim 10, wherein said structure is formed by extruding said polymeric material, and said tag includes a polymeric tape containing said amorphous metal that is coextruded along with said polymeric material to imbed said metal into a wall of said structure.

12. The electromagnetic tagging system of claim 11, herein said polymeric tape is color coded to indicate the location of the tag on the structure so that said structure, when buried, can be oriented with the tag closest to the surface of the earth.

13. The electromagnetic tagging system of claim 10, wherein said structure is a container, and said plurality of tag means are arranged around a lid of said container.

14. An electromagnetic tagging system for remotely detecting and locating a buried structure formed from a non-electrically conducting, non-magnetic polymeric material with respect to the surface of the ground by a means for generating a fluctuating magnetic field characterized by:

least one tag means, integrated into said structure, and including a magnetic amorphous metal target for generating a signal containing a Barkhansen response when exposed to said fluctuating magnetic field, said tag means being arranged so as to express information concerning said structure, said target being formed from a plurality of elongated particles of a single alloy of amorphous magnetic metal embedded in the non-electrically conducting, non-magnetic polymeric material forming the structure and having length to diameter aspect ratios of at least three to one, said particles being aligned parallel to one another along their longitudinal axes and sufficiently close end-to-end to be magnetically linked to one another, and portable circuit means movable with respect to said surface of the ground for remotely detecting said Barkhausen response in said generated signal.

15. The electromagnetic tagging system of claim 14, wherein said circuit means is capable of simultaneously detecting the Barkhausen response of at least two of said tag means when moved along said control surface.

16. The electromagnetic tagging system of claim 14, further comprising a plurality of tag means and wherein said structure is an elongated polymeric conduit, and said tag means are spaced on a wall of said conduit along the longitudinal axis thereof so that the length and orientation of said conduit may be determined.

17. An electromagnetic tagging system for remotely detecting and locating a structure formed from a non-electrically conductive, non-magnetic material situated behind a barrier having a control surface by a means for generating a fluctuating magnetic field comprising:

a plurality of tag means affixed to said structure, and arranged in a pattern for expressing the identity, orientation or extent of said structure, each tag means including an amorphous magnetic metal target formed from a plurality of elongated particles of a single alloy of amorphous magnetic metal embedded in the same non-electrically conducting, non-magnetic material forming the structure and having an aspect ratio of at least 3 to 1 and being aligned substantially parallel with respect to their longitudinal axes and being sufficiently close to be magnetically linked to one another for generating a signal containing a Barkhausen response that provides a signature code expressing information concerning the structure when exposed to said fluctuating magnetic field, and portable circuit means movable relative to said control surface for remotely detecting said Barkhausen response in said generated signal, and circuit means including a means for decoding said signature code.

* * * * *